United States Patent [19]
Patterson

[11] Patent Number: 5,672,259
[45] Date of Patent: Sep. 30, 1997

[54] SYSTEM WITH ELECTROLYTIC CELL AND METHOD FOR PRODUCING HEAT AND REDUCING RADIOACTIVITY OF A RADIOACTIVE MATERIAL BY ELECTROLYSIS

[76] Inventor: James A. Patterson, 2074 20th St., Sarasota, Fla. 34234

[21] Appl. No.: 653,194

[22] Filed: May 24, 1996

[51] Int. Cl.$^6$ .............................. C25B 9/00; C25B 15/08
[52] U.S. Cl. .............................. 205/43; 205/44; 205/687; 205/769; 205/758; 204/275; 204/284; 204/290 R
[58] Field of Search .................................. 204/275, 284, 204/290 R; 205/68.7, 758, 769, 43, 44; 376/100, 146

[56] References Cited

U.S. PATENT DOCUMENTS

| | | | |
|---|---|---|---|
| 4,316,786 | 2/1982 | Yu et al. | 204/275 X |
| 5,318,675 | 6/1994 | Patterson | 204/275 X |
| 5,372,688 | 12/1994 | Patterson | 204/275 X |
| 5,607,563 | 3/1997 | Patterson | 204/269 |

Primary Examiner—Donald R. Valentine
Attorney, Agent, or Firm—Charles J. Prescott

[57] ABSTRACT

An electrolytic cell, system and method for producing excess heat for use and for deactivation an actinide series metal by electrolysis in an aqueous media. The electrolytic cell includes a non-conductive housing having an inlet and an outlet and spaced apart first and second conductive grids positioned within the housing. A plurality of preferably cross linked polymer non-metallic cores each having an improved conductive exterior metallic surface formed of one or more of the actinides or daughter elements therefrom to form a bed of conductive beads are positioned within the housing in electrical contact with the first grid adjacent the inlet. The non-conductive cores are preferably sulfonated and then evaporation loaded with an actinide salt solution, dried and fired at decomposition temperature of the salt. An electric power source in the system is operably connected across the first and second grid whereby electrical current flows between the grids within the aqueous media flowing through the cell.

18 Claims, 1 Drawing Sheet

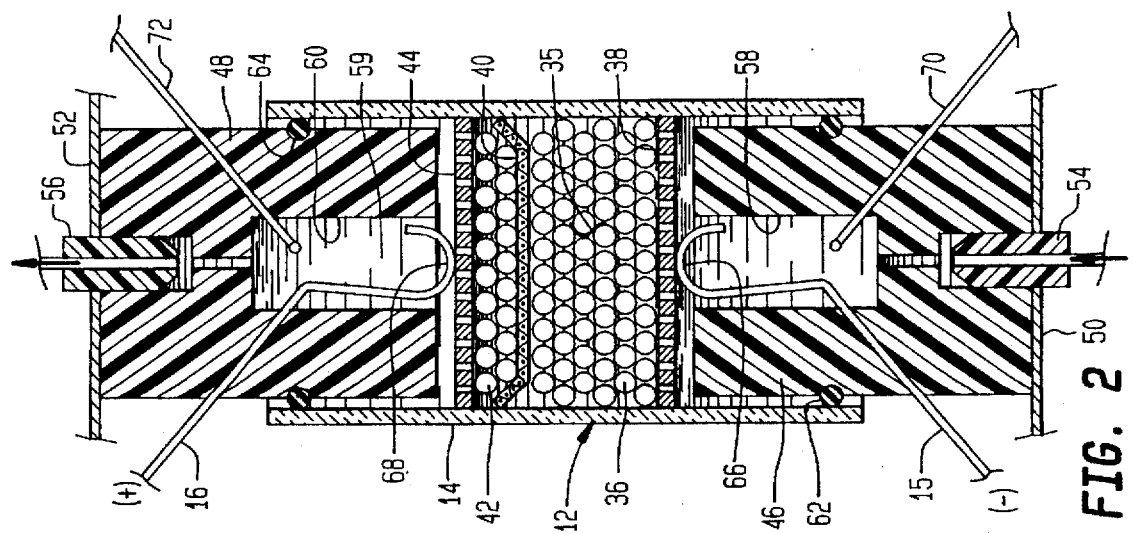
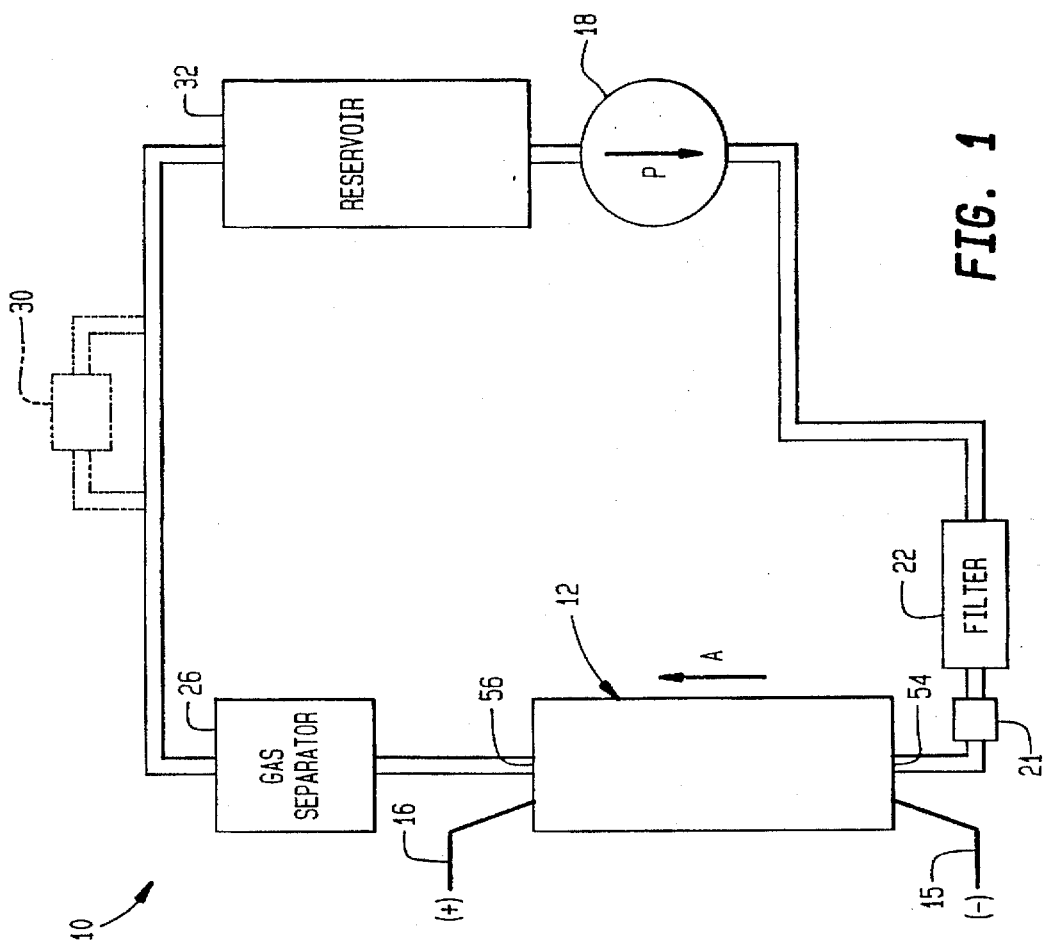

SYSTEM WITH ELECTROLYTIC CELL AND METHOD FOR PRODUCING HEAT AND REDUCING RADIOACTIVITY OF A RADIOACTIVE MATERIAL BY ELECTROLYSIS

BACKGROUND OF THE INVENTION

1. Scope of Invention

This invention relates generally to electrolytic cells, and more particularly to an electrolytic cell and system for producing excess heat and for deactivating radioactive metals of the actinide from the group consisting of actinium, thorium, protactinium, uranium, neptunium, plutonium, americium, curium, berkelium, californium, einsteinium, fermium, mendelevium, and lawrencium series of metals by electrolysis.

2. Prior Art

The utilization of palladium coated microspheres or beads as a catalytic agent for the absorption of hydrogen is taught in prior U.S. Pat. Nos. 4,948,355 ('355) and 5,086,031 ('031). In these patents, the utilization of cross linked polymer microspheres forming an inner core and having a coating of palladium and other halide forming metals thereatop exhibit significant improvements in the level of hydrogen absorption and the absorption of isotopes of hydrogen.

Utilizing these catalytic microspheres led to the invention disclosed in U.S. Pat. Nos. 5,318,675 ('675) and 5,372,688 ('688) which teach an electrolytic cell, system and method for, inter alia, producing excess heat within a liquid electrolyte.

More recently, U.S. Pat. No. 5,494,559 ('559) discloses an improvement in the layer structure of the catalytic microspheres or beads within an electrolytic cell. The combination of nickel/palladium layers enhance the production of excess heat within the liquid electrolyte.

In each of these prior '675, '688 and '559 U.S. patents, the electrolytic cell described therein included an inlet and an outlet facilitating the flow of the liquid electrolyte therethrough. Thus, as the liquid electrolyte is passed through the electrolytic cell, it is acted upon catalytically by the particular bed of catalytic particles contained within the housing of the electrolytic cell to produce excess heat for use.

The present invention improves upon the structure and composition of the catalytic particles which make up the active particle bed within the electrolytic cell through the utilization of non-metallic cores having a metallic surface formed of one or more elements taken from the actinide series or daughter elements derived therefrom.

BRIEF SUMMARY OF THE INVENTION

This invention is directed to an electrolytic cell, system and method for producing excess heat for use and for deactivation actinide series metals by electrolysis in an aqueous media. The electrolytic cell includes a non-conductive housing having an inlet and an outlet and spaced apart first and second conductive grids positioned within the housing. A plurality of preferably cross linked polymer non-metallic cores each having an improved conductive exterior metallic surface formed of one or more of the actinides or daughter elements derived therefrom to form a bed of conductive beads are positioned within the housing in electrical contact with the first grid adjacent the inlet. The non-conductive cores are preferably sulfonated and then evaporation loaded with an actinide salt solution, dried and fired at substantially decomposition temperature of the salt. An electric power source in the system is operably connected across the first and second grids whereby electrical current flows between the grids within the aqueous media flowing through the cell.

It is therefore an object of this invention to provide an improved electrolytic cell and system for producing excess heat.

It is yet another object of this invention to provide an improved electrolytic cell, system and method for producing excess heat for use and for deactivating radioactive materials by electrolysis in an aqueous media.

It is still another object of this invention to provide a method of preparing catalytic beads for use in an electrolytic cell, system and method for producing excess heat for use and for deactivating radioactive material within the actinide metal series and daughter elements derived therefrom.

In accordance with these and other objects which will become apparent hereinafter, the instant invention will now be described with reference to the accompanying drawings.

BRIEF DESCRIPTION OF THE DRAWINGS

FIG. 1 is a schematic view of a system and electrolytic cell embodying the present invention.

FIG. 2 is a section view of the electrolytic cell shown in FIG. 1.

DETAILED DESCRIPTION OF THE INVENTION

Referring now to the drawings, a system embodying concepts of the invention utilized during testing procedures is shown generally at numeral 10. This system 10 includes an electrolytic cell shown generally at numeral 12 interconnected at each end with a closed loop electrolyte circulation system. The circulation system includes a constant volume pump 18 which draws a liquid electrolyte 59 from a reservoir 32 and forces the electrolyte 59 in the direction of the arrow into inlet 54 of electrolytic cell 12. After the electrolytic cell 12 is completely filled with the electrolyte 59, the electrolyte then exits an outlet 56, thereafter flows into a gas separator 26 which is provided to separate and recombine hydrogen and oxygen gas from the electrolyte 59. An in-line filter 22 capable of filtering down to 1.2 microns of particle size is provided for filtration of debris within the system.

In FIG. 2, the details of the electrolytic cell 12 utilized during testing procedures is there shown. A cylindrical glass or nylon non-conductive housing 14, open at each end, includes a moveable non-conductive end member 46 and 48 at each end thereof. These end members 46 and 48 are sealed within the housing 14 by O-rings 62 and 64. The relative spacing between these end members 46 and 48 is controlled by the movement of end plates 50 and 52 thereagainst.

Also shown in FIG. 2 is an in-line heater 21 disposed between the filter 22 and the cell 12. This heater 21 is provided to heat the electrolyte liquid 59 as it flows through the system 10 and the cell 12. Note importantly that the heater 21 may be positioned anywhere in the closed system electrolyte flow path as the heating applied is of a steady state nature rather than only a pre-heating condition of the electrolyte, although positioning of the heater 21 is preferred to be adjacent the inlet 54 of the cell 12 for better liquid electrolyte temperature control. The heating of the electrolyte external to the cell 12 is one means for triggering and enhancing the catalytic reaction within the cell 12 to produce a positive temperature differential ($\Delta T$) of the electrolyte as it flows through the cell 12. Another means preferred for triggering this heat production reaction between the electrolyte 59 and a bed 35 of conductive particles 36 within the cell 12 is by the application of sufficient electric d.c. current across electrodes 15 and 16 as described herebelow.

Each of the end members 46 and 48 includes an inlet stopper 54 and an outlet stopper 56, respectively. Each of these stoppers 54 and 56 define an inlet and an outlet passage, respectively into and out of the interior volume, respectively, of the electrolytic cell 12. These end members 46 and 48 also include a fluid chamber 58 and 60, respectively within which are mounted electrodes 15 and 16, respectively, which extend from these chambers 58 and 60 to the exterior of the electrolytic cell 12 for interconnection to a constant current-type d.c. power supply (not shown) having its negative and positive terminals connected as shown. Also positioned within the chambers 58 and 60 are thermocouples 70 and 72 for monitoring the electrolyte temperature at these points of inlet and outlet of the electrolytic cell 12. However, in the experiments reported herebelow, the inlet temperature of the liquid electrolyte was measured just outside of the cell 12 immediately upstream of stopper 54 to more accurately reflect true temperature differential ($\Delta T$) of the liquid electrolyte 59 while passing through the cell 12.

Thus, all exposed surfaces to the liquid media are non-metallic except for the conductive beads and the conductive grid.

A plurality of separate, packed conductive beads or particles 36 are positioned to define a bead bed 35 within housing 14 immediately adjacent and against a conductive foraminous or porous grid 38 formed of platinum and positioned transversely across the housing 14 as shown. These conductive beads 36 are described in detail herebelow.

Still referring to FIG. 2, a non-conducive foraminous or porous nylon mesh 40 is positioned against the other end of these conductive particles 36 so as to retain them in the position shown. Adjacent the opposite surface of this non-conductive mesh 40 is a plurality of non-conductive spherical beads, or more generally particles, 42 formed of cross-linked polystyrene and having a nominal diameter of about 3.0 mm. Against the other surface of this layer of non-conductive beads 42 is a conductive foraminous or porous grid 44 formed of platinum and positioned transversely across the housing 14 as shown.

Should the system 10 boil off or otherwise inadvertently lose all liquid electrolyte within the cell 12, a means of preventing system damage is preferred which replaces the non-conductive beads 42 with non-metallic spherical cation ion exchange polymer conductive beads preferably made of cross-linked styrene divinyl benzene having fully presulfonated surfaces which have been ion exchanged with a lithium salt. This preferred non-metallic conductive microbead structure will thus form a "salt bridge" between the anode 44 and the conductive particles 36, the non-conductive mesh 40 having apertures sufficiently large to permit contact between the conductive particles 36 and the conductive non-metallic microbeads. The mesh size of mesh 40 is in the range of 200–500 micrometers. This preferred embodiment thus prevents melting of the sulfonated non-conductive beads 42 while reducing cell resistance during high loading and normal operation.

The end of the electrode 15 is in electrical contact at 66 with conductive grid 38, while electrode 16 is in electrical contact at 68 with conductive grid 44 as shown. By this arrangement, when there is no electrolyte within the electrolytic cell 12, no current will flow between the electrodes 15 and 16.

ELECTROLYTE

When the electrolytic cell 12 is filled with a liquid electrolyte 59, electric current will flow between the electrodes 15 and 16. The preferred formulation for this electrolyte 59 is generally that of a conductive salt in solution with water. The preferred embodiment of water is that of either light water ($H_2^1O$) or heavy water and, preferably deuterium ($H_2^2O$). The purity of all of the electrolyte components is of utmost importance. The water ($H_2^1O$) and the deuterium ($H_2^2O$) must have a minimum resistance of one megohm with a turbidity of less than 0.2 N.T.U. This turbidity is controlled by ultra membrane filtration. The preferred salt solution is lithium sulfate ($Li_2SO_4$) in a 1-molar mixture with water and is of chemically pure quality. In general, although a lithium sulfate is preferred, other conductive salts chosen from the group containing boron, aluminum, gallium, and thallium, as well as lithium, may be utilized. The preferred pH or acidity of the electrolyte is 9.0.

CONDUCTIVE PARTICLES OR BEADS

Preparation of Non-Conductive Cores

Spherical polymer beads were prepared which would contain a poragen of a low molecular weight polystyrene (45,000 mw). The ratios of divinylbenzene (DVB) to polystyrene was 60/40. The sample of resin was sulfonated to undergo a weight analysis.

A mixture of DVB (95 g.) containing 80.4% active ingredient with no inhibitor and 5.0 g polystyrene (45,000 mw) was stirred until all was dissolved. To this mixture was added 1.2 g benzoyl peroxide (1.25%) and stirred until all dissolved. This mixture was charged to the 2-liter reaction kettle equipped with a stirrer, reflux condenser, and thermometer which contained 10.0 g Marsparse (1.0%), 10.0 g acacia (1.0%) and 1000 ml. deionized (D.I.) water. The mixture was stirred until the organic components were dispersed as fine droplets. The mixture was heated to 86° C. for 4 hours. This process is known as suspension polymerization. The polymer beads were filtered and washed with D.I. water. The beads were air dried overnight. The weight was 93.4 g.

Forty (40)g of the neutral resin were added to 300 ml (99%) sulfuric acid with stirring. The mixture was heated to 100° C. for 2 hours. The mixture was cooled to about 20° C. and slowly added to a large quantity of water. The beads were filtered and washed with D.I. water to neutral. The beads were air dried to a final weight of 39.6 g. The beads were tan in color and large craters could be observed on the surface of the beads.

A summary of the above preparation results of these non-conductive cores is shown in Table I herebelow.

TABLE I

| SAMPLE | DVB (g) | PS (g) | PS (MW) | NEUTRAL Resin (g) | AFTER Me$_2$Cl$_2$ (g) | A. AFTER SONICATE (g) | NEUTRAL RESIN (g) | B. SULFONATED RESIN (g) |
| --- | --- | --- | --- | --- | --- | --- | --- | --- |
| JAP-2 | 95 | 5 | 45,000 | 46.7 | 48.1 | 44.2 | 40.0 | 39.6 |

Preparation of Conductive Beads

A sample of the above prepared non-metallic cores were screened using a #16 screen (Tyler 14 mesh, 1.18 mm openings) to +#16. ten (10) cc of each mesh size were mixed with a mixture of 30 ml D.I. H$_2$O and the following Uranium and Thorium salts:

Uranium nitrate U O$_2$ (NO$_3$)$_2$ $1.9 \times 10^{-3}$ moles

Thorium nitrate Th (NO$_2$)$_4$ $0.9 \times 10^{-3}$ moles

Each sample was heated in an infrared oven to 180° C. or to dryness. The beads were then mixed while still hot and placed in a 20 ml. ceramic crucible. The loaded crucible was then fired over a period of 2 hours to a temperature of 500° C., the decomposition temperature of Th (NO$_2$)$_4$>Th O$_2$. At this point, the UO$_2$ (NO$_3$)$_2$ had also decomposed to UO$_4$ (yellow)>UO$_2$ (dark green), both of which were insoluble in water.

TEST FOR RADIOACTIVITY

Two (2.0) cm$^3$ of the dry, activated conductive beads were placed into a standard prepared well of a radiation counter, SE International Monitor #4 standardized with Cesium 137. The monitor window was also machined to fit the curvature of the 1.9 cm diameter nylon cell housing 14 so that relatively accurate monitoring of the bead bed 35 in the cell 12 could be obtained during cell operation.

In the standard well, 2 cc of beads produced a radioactivity count of 3000 counts per minute (cpm). After packing in the cell 12, the housing 14 being nylon, the radioactivity count was 300 cpm. When the liquid electrolyte 59 (0.5 m Li$_2$SO$_4$) was passed onto the cell 12, bead radioactivity dropped to 150 cpm.

CELL RESISTANCE

In preparing the electrolytic cells for testing, the cell resistance utilizing a Whetstone Bridge or ohm meter was utilized prior to the introduction of the electrolyte into the electrolytic cell. This cell resistance, when dry, should be infinitely high. Otherwise, a short between the anode screen and the cathode beads exists and the unit would have to be repacked. When testing with electrolyte present at 0.02 amps, the resistance should be in the range of 100 to 200 ohms per sq. cm of cross section area as measured transverse to the direction of current flow.

RELATIVE SURFACE AREAS

The range in diameters of the conductive particles as above described is relatively broad, limited primarily by the ability to plate the cores and the economic factors involved therein. As a guideline however, it has been determined that theta exists a preferred range in the ratio between the total surface area of all of the conductive particles collectively within the electrolytic cell and the inner surface area of the non-conductive housing which surrounds the bed of conductive particles.

A minimum preferred ratio of the total bead surface area to the inner housing surface area is in the range of 5 to 1 (5:1). However, an ideal area ratio is 10 to 1 (10:1) and is typically utilized in the experiments reported herebelow. This ratio is thus affected primarily by the size of the conductive particles, the smaller the diameter, the higher the ratio becomes.

EXPERIMENTAL RESULTS

The testing procedures incorporated two stages. The first stage may be viewed as a loading stage during which a relatively low level current (approx. 0.05 amps) is introduced across the conductive members, that current facilitated by the presence of the electrolyte 59 as previously described.

LOADING

During the initial loading, electrolysis of the aqueous media within the liquid electrolyte occurs so that the hydrogen active surface of the conductive particles fully absorbs and combines with hydrogen, i.e. becomes "loaded". This loading takes about two hours under a current flow through the cell of about 0.05 amps per two (2) cm$^3$ of particle volume. As the particles load with hydrogen, the resistance of the cell will be seen to increase. The cell's resistance measured at constant temperature should be seen to raise about 10%. It is recommended that the loading should proceed at least until the resistance is no longer increasing. As loading proceeds further, a decrease in resistance will appear.

TEST RUN

After hydrogen and/or hydrogen isotope, loading of the hydrogen active material of the conductive beads, the current level between conductive members is then incrementally increased, during which time the electrolyte temperature differential is monitored. The temperature of the electrolyte 59 circulating through the electrolytic cell 12 and system 10 was fully monitored, along with temperature differential between thermocouples 70 and 72 and flow rate of the liquid electrolyte 59. Preferably, and more accurately, in lieu of placing the thermocouple 70 as shown in FIG. 2, the electrolyte inlet temperature was monitored immediately upstream of stopper 54 to more accurately reflect temperature differential ($\Delta T$).

In general, all tabular results herebelow represent data taken on a steady state basis, input and output temperatures of the liquid electrolyte 59 being taken upstream of stopper 54 and at 72, respectively, voltage (v) and current flow (a) across the electrolytic cell 12 measured between terminals or conductors 15 and 16. The flow rate of the liquid electrolyte 59 (ml/min) and calculated wattage input and wattage output and percent yield are also shown. Wattage input to the cell 12 is calculated as the product of voltage (v) X amps (a), while wattage output is calculated based upon a formula for converting calorific heat to power and watts according to a formula Watts Out=Flow Rate (liters per minute)×ΔT×70.

RADIOACTIVITY MONITORING

In addition to monitoring the above parameters, radioactivity level in counts per minute (cpm) was also monitored utilizing the above-described modified radioactivity sensor fitted around the cell 12. The results of this experiment are summarized in Table II herebelow.

TABLE II

| Radioactivity (cpm) | Time | ΔT °C. (To-Tin) | Amps (A) | Volts (V) | Flow Rate (ml/min) | Watts In | Watts Out |
|---|---|---|---|---|---|---|---|
| 150 | 12:30 | −0.2 | .00 | .00 | 10 | .00 | .00 |
| 150 | 12:40 | 0.9 | .02 | 1.0 | 10 | 0.20 | 0.63 |
| 150 | 12:41 | 0.9 | .03 | 5.0 | 10 | 0.15 | 0.63 |
| 100 | 1:20 | 0.9 | .07 | 4.0 | 10 | 0.28 | 0.63 |
| 80 | 1:41 | set | .10 | 8.5–9 | 10 | 0.9 | — |
| 80 | 1:50 | 2.6 | .10 | 7.5 | 10 | 0.75 | 1.82 |
| 60 | 2:20 | .0 | .10 | 7.0 | 10 | 0.70 | 0.63 |
| 40 | 5:05 | 4.4 | .14 | 10.0 | 10 | 1.40 | 3.08 |
| 20 | 9:30 | 4.5 | .12 | 10.0 | 10 | 1.20 | 3.15 |

SUMMARY

During steady state operation for a period of approximately 20 hours, the wattage output of the above-described experimental cell 12 within the system 10 produced approximately 2.25 watts of power output in the form of heated electrolyte. Referring to FIG. 1, this heat energy may be utilized by any device or system shown typically at 30 in phantom which is capable of converting heat energy derived from a heated liquid into other forms of energy or use.

After testing, the conductive beads 36 were removed and placed in the standard well of the Turner measuring device and were found to have a radioactivity level of 350 cpm.

Therefore, in addition to the production of excess heat at a rate of 2.25 watts output for a 20-hour period, the radioactivity of the conductive beads dropped from an initial radioactivity count of 3000 cpm to 350 cpm, a loss in radioactivity of approximately 88%.

To insure that the radioactive material had not simply been separated from the conductive beads 36 and redeposited elsewhere in the system 10, a background radioactivity was monitored to be in the range of 2 to 5 cpm. The counter itself was also checked periodically for correct calibration. In addition, the in-line filter 22 showed a radioactivity count after the experiment of background level of between 2 and 5 cpm, the aqueous media or liquid electrolyte 59 also showed an after-test radioactivity count of only 2 to 5 cpm (background level) and all vapor condensed by the gas separator 26 had no trace of any radioactivity whatsoever. The liquid media was then dried and rechecked to insure that no radiation screening had occurred—none had as the radiation count remained at background level (205 cpm). The dried media had a green color. There were no leaks whatsoever of the aqueous media from the system 10 during testing.

EXPERIMENT REPEATED

The above experiment was repeated with the initial radiation count of the conductive beads being approximately 3400 cpm when placed in the standard well of the Turner apparatus. After 24 hours of operation at approximately 0.8 amps, 10 volts and the flow rate of 10 ml per hour, during which time the temperature differential (ΔT) across the electrolytic cell 12 was approximately 3.7° C., the standard well count of the after-run conductive beads was reduced to 500 to 600 cpm, with all other components showing no more than trace or background radiation count levels of approximately 2 to 5 cpm. This repeat test therefore represented a reduction of approximately 84% in radioactivity.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A system for producing heat and for reducing radioactivity of a radioactive material by electrolysis in a liquid electrolyte comprising:

an electrolytic cell including a non-conductive housing and an inlet and an outlet;

a plurality of conductive beads each including:
      a non-conductive core;
      a radioactive metallic actinide combined with, and forming a conductive surface over, said non-conductive core;

a first conductive porous grid means in electrical communication with said plurality of conductive beads;

a second conductive porous grid means electrically spaced from said plurality of conductive beads and which is positioned closer to said outlet than said first conductive grid means;

means for pumping said liquid electrolyte into said electrolytic cell through said inlet, said electrolyte having a conductive salt in solution with water, said electrolyte exiting from said electrolytic cell through said outlet;

means for applying an electric current between said first and second conductive grid means.

2. A system as set forth in claim 1, wherein:

said conductive surface is taken from the group of metallic actinides consisting of actinium, protactinium, neptunium, plutonium, americium, curium, berkelium, californium, einsteinium, fermium, mendelevium, and lawrencium.

3. A system as set forth in claim 1, wherein:

said conductive surface is taken from the actinide series and daughter elements therefrom.

4. A system as set forth in claim 1, wherein:

said non-conductive core is sulfonated.

5. An electrolytic cell for producing heat and for reducing radioactivity of a radioactive material by electrolysis in an aqueous media comprising:

a non-conductive housing;

a plurality of conductive beads each including:
      a non-conductive core;
      a radioactive metallic actinide combined with, and forming a conductive surface over said non-conductive core;

a first conductive porous grid means in electrical communication with said plurality of conductive beads;

a second conductive porous grid means electrically spaced from said plurality of conductive beads which is positioned closer to said outlet than said first conductive grid means.

6. An electrolytic cell as set forth in claim 5, wherein:

said conductive surface is taken from the group of metallic actinides consisting of actinium, protactinium, neptunium, plutonium, americium, curium, berkelium, californium, einsteinium, fermium, mendelevium, and lawrencium.

7. An electrolytic cell as set forth in claim 5, wherein:

said conductive surface is taken from the actinide series and daughter elements thereof.

8. An electrolytic cell as set forth in claim 5, wherein:

said non-conductive core is sulfonated.

9. A method of producing heat and reducing radioactivity of a radioactive material by electrolysis in an aqueous media comprising the steps of:

A. providing an electrolytic cell including:
     a non-conductive housing and an inlet and an outlet;
     a first conductive porous grid positioned within said housing adjacent to said inlet;
     a second conductive porous grid positioned within said housing spaced from said first conductive grid and adjacent to said outlet;
     a plurality of conductive beads each including:
       a non-conductive core;
       a radioactive metallic actinide combined with, and forming a conductive surface over said non-conductive core;
   B. circulating said aqueous media through said electrolytic cell;
   C. passing an electrical current between said first and second grids when said aqueous media is circulating within said electrolytic cell;
   D. removing heat from said aqueous media for use external to and separate from said electrolytic cell after said aqueous media exits said electrolytic cell through said outlet;
   E. continuing to operate said cell in accordance with steps A, B, C, D until the radioactivity of said radioactive material is reduced.

10. A method as set forth in claim 9, wherein:

said aqueous media includes a conductive salt which is lithium sulphate.

11. A system as set forth in claim 9, wherein: said conductive surface is taken from the group of metallic actinides consisting of actinium, protactinium, neptunium, plutonium, americium, curium, berkelium, californium, einsteinium, fermium, mendelevium, and lawrencium.

12. A system for reducing radioactivity of a radioactive material by electrolysis in a liquid electrolyte, comprising:

an electrolytic cell including a non-conductive housing and an inlet and an outlet;
   a plurality of conductive beads each including:
     a non-conductive core;
     said radioactive material forming a conductive surface over said non-conductive core;
   first conductive porous grid means in electrical communication with said plurality of conductive beads;
   a second conductive porous grid means electrically spaced from said plurality of conductive beads and which is positioned doser to said outlet than said first conductive grid means;
   means for pumping said liquid electrolyte through said electrolytic cell, said liquid electrolyte including a conductive salt in solution with water;
   means for applying an electric current between said first and second conductive grid means.

13. A system as set forth in claim 12, wherein:

said conductive surface includes a metallic actinide taken from the group of metallic actinides consisting of actinium, protactinium, neptunium, plutonium, americium, curium, berkelium, californium, einsteinium, fermium, mendelevium, and lawrencium.

14. A system as set forth in claim 12, wherein:

said conductive surface includes a metallic actinide taken from the actinide series and daughter elements therefrom.

15. An electrolytic cell for reducing radioactivity of a radioactive material by electrolysis in an aqueous media comprising:

a non-conductive housing;
   a plurality of conductive beads each including:
     a non-conductive core;
     a conductive surface formed over said non-conductive core formed of said radioactive material;
   a first conductive porous grid means in electrical communication with said plurality of conductive beads;
   a second conductive porous grid means electrically spaced from said plurality of conductive beads which is positioned closer to said outlet than said first conductive grid means.

16. An electrolytic cell as set forth in claim 15, wherein:

said radioactive material includes a metallic actinide is taken from the group consisting of actinium, protactinium, neptunium, plutonium, americium, curium, berkelium, californium, einsteinium, fermium, mendelevium, and lawrencium.

17. A method of reducing radioactivity of a radioactive material by electrolysis in an aqueous media comprising the steps of:

A. providing an electrolytic cell including:
     a non-conductive housing and an inlet and an outlet;
     a first conductive porous grid positioned within said housing adjacent to said inlet;
     a second conductive porous grid positioned within said housing spaced from said first conductive grid and adjacent to said outlet;
     a plurality of conductive beads each including:
       a non-conductive core;
       a radioactive metallic actinide combined with, and forming a conductive surface over said non-conductive core;
   B. circulating said aqueous media through said electrolytic cell;
   C. passing an electrical current between said first and second grids when said aqueous media is circulating within said electrolytic cell;
   D. continuing to operate said cell in accordance with steps A, B, C until the radioactivity of said radioactive material is reduced.

18. A system as set forth in claim 17, wherein: said conductive surface is taken from the group of metallic actinides consisting of actinium, protactinium, neptunium, plutonium, americium, curium, berkelium, californium, einsteinium, fermium, mendelevium, and lawrencium.

* * * * *

UNITED STATES PATENT AND TRADEMARK OFFICE
CERTIFICATE OF CORRECTION

PATENT NO. : 5,672,259
DATED : September 30, 1997
INVENTOR(S) : James A. Patterson It is certified that error appears in the above-indentified patent and that said Letters Patent is hereby corrected as shown below:

Column 9, line 62, replace "doser" with -- closer --.

Signed and Sealed this

Sixteenth Day of December, 1997

Attest:

BRUCE LEHMAN

Attesting Officer

Commissioner of Patents and Trademarks